(12) United States Patent
Liu

(10) Patent No.: US 7,572,126 B2
(45) Date of Patent: Aug. 11, 2009

(54) FLOWING COLORS OIL PAINTING

(76) Inventor: Bihua Liu, 48-23 203 St., Bayside, NY (US) 11364

( * ) Notice: Subject to any disclaimer, the term of this patent is extended or adjusted under 35 U.S.C. 154(b) by 974 days.

(21) Appl. No.: 10/634,526

(22) Filed: Aug. 5, 2003

(65) Prior Publication Data
US 2005/0042580 A1 Feb. 24, 2005

(51) Int. Cl.
*G09B 11/10* (2006.01)
*B05D 1/36* (2006.01)

(52) U.S. Cl. .............. 434/84; 434/81; 434/98; 427/263; 427/268; 427/281; 427/282; 427/288

(58) Field of Classification Search ........... 434/81, 434/84, 98; 427/285, 288, 261–263, 265, 427/267, 268, 280–282; 118/402; 101/115, 101/125, 129
See application file for complete search history.

(56) References Cited

U.S. PATENT DOCUMENTS

| | | | | |
|---|---|---|---|---|
| 2,651,871 A | * | 9/1953 | Lynden | 427/265 |
| 3,553,855 A | * | 1/1971 | Oberg | 434/84 |
| 3,772,421 A | * | 11/1973 | Costich | 264/74 |
| 4,378,387 A | * | 3/1983 | Mitchell | 427/263 |
| 4,490,413 A | * | 12/1984 | Stimson | 427/262 |
| 5,348,766 A | * | 9/1994 | Latham | 427/202 |
| 5,509,989 A | * | 4/1996 | Taubl | 156/238 |
| 5,698,032 A | * | 12/1997 | Weis | 118/402 |
| 5,958,525 A | * | 9/1999 | Green et al. | 428/14 |

OTHER PUBLICATIONS

Shoalhaven Water, "Water Art", www.shoalwater.nsw.gov.au/4education/wtart.htm, May 20, 2003.*
Preschool Education "Oil and Water Painting" by Jane Talmas, www.preschooleducation.com/aart.shtml, Mar. 2, 2000.*
www.flowingcolors.com*

* cited by examiner

*Primary Examiner*—Dmitry Suhol
(74) *Attorney, Agent, or Firm*—Law Offices of Albert Wai-Kit Chen, PLLC

(57) ABSTRACT

The present invention provides an innovating and unique oil painting method called "Flowing Colors". The novel method blends painting oil with water-soluble materials to achieve accurate images as well as colorful dynamics.

12 Claims, 1 Drawing Sheet

FLOWING COLORS OIL PAINTING

FIELD OF THE INVENTION

The present invention provides an innovating and unique oil painting method called "Flowing Colors". The novel method blends painting oil with water-soluble materials to achieve accurate images as well as colorful dynamics.

BACKGROUND OF THE INVENTION

Flowing Colors, also called Splashing Colors, is an innovating, unique oil painting method. It is difficult to confine oils in water to construct the desired shapes. Many artists had attempted to take command of free flowing oil, but could not control oil paints to the point where an image was formed with precision. They could only make abstract paintings but not object paintings with shapes or details. The Flowing Colors method accomplishes this. The method daringly fuses painting oil and water, using water to control the colorful painting oils, flowing the two resisting elements onto wet paper/canvas. The oil and water are mixed yet repelled each other, separated yet commingled together, opposed yet supported each other. The subsequent effect is the ability to form accurate images plus desired colorful dynamics, to express the powerful depiction of high mountains, flying clouds, rolling water, soaring tidal waves, and precise figures. The marriage of water and oil, an unthinkable combination, brings images rich in color, vibrant in lights, sophisticated in fullness and emptiness, and an abstract yet classic form of painting.

DETAILED DESCRIPTION OF THE INVENTION

Definitions

Figure 1:
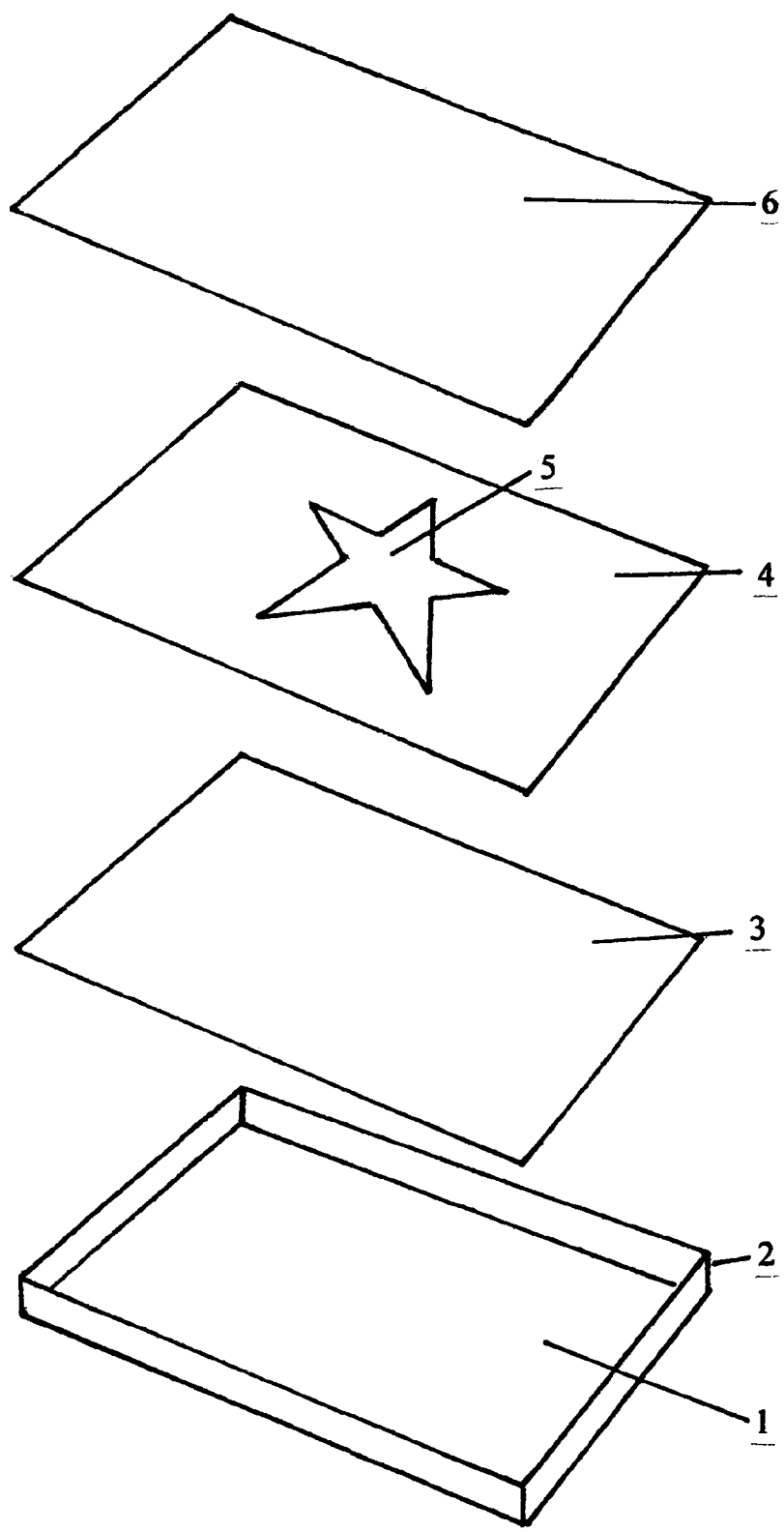
FIG. 1 is a perspective view of the procedure to paint special objects on a painted canvas as described below. Base pan 1 is a flat surface, often rectangular, with raised edges 2. Transferring paper 3 is either watercolor paper or canvas that is used to mix flowing colors. Masking paper 4 is either watercolor paper or canvas wherein a shape of an object 5 (a star in the instant example) is cut out from the paper or canvas. Painted canvas 6 refers to canvas that has been painted. The painted side of the painted canvas faces down.

Unless otherwise stated, the following terms and procedures used in the specification and claims have the meanings given below:

The term "flowing colors" refers to a mixture of an oil-based pigment such as Enamels and an oil in a ratio from about 1:1 to about 5:1 (pigment:oil). Preferably, the mixture is in a ratio about 4:2 (pigment:oil). Flowing color may be stored in a large container or a squeezable plastic bottle with a pointed mouth for further use.

The term "oil" refers to any of numerous mineral, vegetable, and synthetic liquids and animal and vegetable fats that are generally soluble in various organic solvents such as ether but not in water. Preferably, the oil is mineral oil.

The term "base pan" refers to a flat surface, often rectangular, with raised edges around entire perimeter. Examples of base pan include trays, pans, dishes, low edged containers, and etc. Preferably, the base pan is a framed canvas. One skilled in the art would prepare a framed canvas by stretching canvas over a wood frame and securing the canvas on the frame. However, unlike one skilled in the art paint colors on the surface of a framed canvas with the frame in the back, a framed canvas referred to in the present invention is used with the frame facing upwards which serves a function like a dam or wall to prevent water or flowing colors from running off the canvas.

The term "watercolor paper" has its ordinary meaning known to one skilled in the art. The "watercolor paper" can be purchased in any art stores. Preferably, water-color paper is thick enough to absorb water easily. Also, its surface is preferably neither too rough nor too smooth.

The term "canvas" has its ordinary meaning known to one skilled in the art. Canvas can be purchased in any art stores. Preferably, the canvas has no coating on either sides and is made by water absorbing material.

The term "transferring paper" refers to watercolor paper or to canvas that is used to mix flowing colors.

The term "masking paper" refers to watercolor paper or to canvas wherein a shape of an object or figure is cut out from the canvas or watercolor paper, leaving a hollow space on the watercolor paper or canvas wherein the hollow space has the image of the desired object or figure. For example, to produce a masking paper that has a hollow star, one may draw a star on the watercolor paper or canvas, and then cut the star out from the watercolor paper or canvas. Preferably, masking paper is made by watercolor paper as defined above.

The term "painted canvas" refers to canvas that has been painted and dried.

Tools and Materials

1. Flowing colors as defined above.
2. Base pan as defined above.
3. Canvas or watercolor paper as defined above.
4. A device to move flowing colors. An example of such device is a painting brush or a hair dryer. The device is to brush or blow flowing colors in various directions to form desired shapes.
5. A device to wet canvas or watercolor paper. An example of such device, but not limiting, is a spray bottle.
6. Optionally, tapes, rollers, and paper towels.

Method To Make A Painted Canvas

The main point of "Flowing Colors" method of the present invention is to direct and to control oil-diluted colors, (i.e. flowing colors) as they are moved in various directions on a wetted canvas or watercolor paper according to a painter's design. A method to produce a painted canvas by using the instant invention comprises steps illustrated below.

1) Place a blank canvas inside a base pan.
2) Optionally, securing each edge of the blank canvas to the base pan with tapes.
3) Optionally, spray water on the blank canvas with a water spray bottle, and gently brushing off any creases from the canvas with a big brush until the blank canvas is completely smooth and flat.
4) Spray water on the blank canvas to form a thin layer of water (the base pan will prevent water from running away).
5) Deposit one or multiple flowing colors on the wetted blank canvas. If desired, the flowing colors may be deposited on a number of different parts of the blank canvas. Direct the flowing colors to flow freely and mix with each other.
6) Move the flowing colors into various directions to form a desired shape or image. This can be done by moving the base pan in a various ways, or by brushing the flowing colors with a brush, or by blowing the flowing colors into different directions with a hair dryer. For example, moving the base pan left and right allows the flowing colors to form rivers, up and down to form mountains, circularly to form eddy, diagonally to form cloud, and etc.
7) Dry the flowing colors with a drying device such as a hair dryer to stop the flowing colors from flowing further and to make them stay in the desired locations. A colorful painted canvas is complete.
8) Optionally, an artist may wish to paint special objects, images or figures on the painted canvas by using traditional painting methods known to one skilled in the art. The special objects, image or figures can also be painted on the painted canvas by using the flowing colors method of the present invention again.

Methods To Paint Special Objects On A Painted Canvas

Certain special objects, such as vases, animals, humans, and etc. can be added to the painted canvas by using flowing colors method described below. The order of the steps dose not need to be followed exactly.
1) Prepare a painted canvas according to the method described above. Set aside for later use.
2) Prepare a masking paper wherein the desired shape of an object has been drawn and cut out. The masking paper and the painted canvas are preferably the same size.
3) Place a blank transferring paper inside a base pan.
4) Optionally, secure each edge of the blank transferring paper to the base pan with tapes.
5) Optionally, spray water on the blank transferring paper with a water spray bottle, and gently brushing off any creases from the canvas with a big brush until the blank transferring paper is completely smooth and flat.
6) Spray water on the blank transferring paper to form a thin layer of water (the base pan will prevent water from running away).
7) Deposit one or multiple flowing colors on the wetted blank transferring paper. If desired, the flowing colors may be deposited on a number of different parts of the transferring paper. Direct the flowing colors to flow freely and mix with each other.
8) Before the flowing colors on the transferring paper dry up, place the masking paper on the top of the transferring paper, and place the painted canvas on the top of the masking paper. The painted side of the painted canvas should face the masking paper and the transferring paper.
9) Roll the back of the painted canvas gently with a roller. The pre-mixed flowing colors on the transferring paper are now transferred to the painted side of the to painted canvas through the hollow space of the masking paper. The desired object, image or figure is now added to the painted canvas.
10) Remove the painted canvas from the masking paper, and let it dry.
11) Repeat the process to add more images to the painted canvas if desire.

Alternatively, the desired objects, images or figures can be painted to the painted canvas by the following process:
1) Prepare a painted canvas.
2) Place the painted canvas in a base pan. The painted side of the painted canvas should face up.
3) Prepare a masking paper that has the desired image(s).
3) Place the prepared masking paper on the top of the painted canvas.
4) Moisturize the surface of the masking paper evenly.
5) Deposit flowing colors near the edge of the cut out image, and brush the flowing colors over the cut out hollow space.
6) Remove the masking paper, and let the flowing colors on the painted canvas dry up.

EXAMPLES

Cloud Painting

Wet a blank canvas in a based pan with the sprayer. Splash flowing colors, such as red, purple, white, yellow, blue on a wetted canvas. Move the base pan circularly to let the colors mix naturally like clouds. Blow away the mixing flowing colors gently to form dispersing clouds.

Running Water Painting

Wet a blank canvas in a base pan as described above. Splash flowing colors, such as blue or green, on the canvas to allow the flowing colors to flow freely. Add some complementary colors, such as light red, light purple or yellow. Move the base pan left and right to express calm water. Move the base pan diagonally to express a stream. Move the base pan circularly to express high wave and deep eddy. When the flowing colors are dry, add reflection, inverted image, add light and dark colors to express shadows by using the traditionally oil painting methods to achieve three-dimensional effect. Optionally, add objects such as see weeds, leave, dropped flowers, lotus, maple, etc. with flowing colors method or traditional painting methods.

Vase Painting

Prepare a painted canvas according to the method of the present invention, or by using traditional painting methods. Prepare a masking paper with the desired shape or shapes for multiple vases. Place the painted canvas in a base pan with the painted side facing up. Place the prepared masking paper on the top of the painted canvas. Wet the masking paper and brush water evenly. Add the flowing colors near the vase outlines. Move the base pan circularly to allow the flowing colors flowing naturally to cover the hollow space. After the flowing colors are dried, remove the masking paper, and add light and dark color to express shadows to achieve three-dimensional effect.

Flower Painting

On a wetted blank canvas in a base pan, drop the flowing colors by using a squeezable bottle with a pointed mouth. Preferably, one may drop the similar colors and neighboring colors over several layers. Blow each layer separately to form petals of a flower right after the dropping with a hair dryer until the flowing colors are dry and firm. The over flowed colors can be cleaned away by wet towel. Using the same skill to paint the leaves. The leaves color should vary. After the colors dry up, add light and dark colors to express shadows and detailed structure on the flowers and leaves.

Human Body Painting

Prepare a transferring paper by dropping flowing colors on a blank canvas in a base pan. Preferably, the flowing colors are dropped through a squeezable bottle with a pointed mouth. Move the base pan to direct the flowing colors to flow and mix freely. Wait to let the flowing colors partially dry. Prepare a painted canvas. Prepare a masking paper by cutting out a human body image from the masking paper. Attach the masking paper on the painted side of the painted canvas and taped the two layers together. Place the taped masking paper and painted canvas on the base pan above the transferring paper. The masking paper and the painted side of the painted canvas should face the base pan to allow the flowing colors being transferred to the painted canvas through the hollow space on the masking paper. Gently roll a painting roller on the back of the painted canvas. Removed the taped masking paper and painted canvas from the base pan and separating the painted canvas from the masking paper. After the flowing colors on the painted canvas dry up, add light and dark colors to express shadows around the human image to achieve three-dimensional effect.

What is claimed is:

1. A method of preparing an oil painting comprising the following steps, in the order listed, below:
   a) preparing a diluted oil based pigment mixture of one or more colors where each colored pigment is mixed with oil in a ratio of 1:1 (pigment : oil);
   b) placing a water color paper or canvas inside a base pan,
   c) securing each edge of said paper or canvas to the base pan,
   d) moisturizing said paper or canvas using a spray or brush to form a thin film of water on said paper or canvas,
   e) depositing two or more said oil based pigment mixtures on said thinly wetted paper or canvas,
   f) moving said oil based pigment mixtures on said thinly wetted paper or canvas with directed motion and deliberate intent to form a specific image,
   g) producing an image resulting from said directed motion and the interaction between said pigment mixtures, said thin film of water and said paper or canvas such that a predetermined image is produced on said paper or canvas,
   h) allowing the pigment oil mixtures, water, paper or canvas to dry, leaving a specific oil paint image on said paper or canvas, thus creating a dried oil painting base image,
   i) placing a second water color paper or canvas, called a transferring paper, or canvas inside a base pan,
   j) preparing a mask with a hollow space with a desired image or images, to be used with said transferring paper or canvas,
   k) moisturizing said transferring paper or canvas using a spray or brush to form a thin film of water on said paper or canvas,
   l) depositing two or more said oil based pigment mixtures on said thinly wetted transferring paper or canvas,
   m) moving said oil based pigment mixtures on said thinly wetted transferring paper or canvas with directed motion and deliberate intent to form a specific image,
   n) producing an image resulting from said directed motion and the interaction between said pigment mixtures, said thin film of water and said transferring paper or canvas such that a predetermined image is produced on said transferring paper or canvas, thus creating a freshly painted image on said transferring paper or canvas,
   o) placing said mask directly onto said freshly painted image on said transferring paper or canvas at a desired predetermined location,
   p) placing on top of said freshly painted and masked transferring paper or canvas said previously prepared and dried oil painting base image,
   q) transferring said freshly painted and masked transferring paper or canvas image onto said previously painted paper or canvas base image,
   r) removing said previously painted water color paper or canvas base image, from said masked transferring paper or canvas, and
   s) allowing the transferred image to dry on top of the previously painted base image.

2. A method according to claim 1 wherein the pigment is enamel.

3. A method according to claim 1 wherein water color paper is used.

4. A method according to claim 3 wherein the pigment is enamel.

5. A method according to claim 3 wherein canvas is used.

6. A method according to claim 5 wherein the pigment is enamel.

7. A method according to claim 1 wherein the oil is mineral oil, vegetable oil, and synthetic oil.

8. A method according to claim 7 where the oil is mineral oil.

9. A method according to claim 2 where the oil is mineral oil, vegetable oil, or synthetic oil.

10. A method according to claim 9 where the oil is mineral oil.

11. A method according to claim 6 where the oil is mineral oil, vegetable oil, or synthetic oil.

12. A method according to claim 11 where the oil is mineral oil.

* * * * *

UNITED STATES PATENT AND TRADEMARK OFFICE
CERTIFICATE OF CORRECTION

PATENT NO. : 7,572,126 B2 Page 1 of 1
APPLICATION NO. : 10/634526
DATED : August 11, 2009
INVENTOR(S) : Liu It is certified that error appears in the above-identified patent and that said Letters Patent is hereby corrected as shown below:

On the Cover page, (*) Notice: Subject to any disclaimer, the term of this patent is extended or adjusted under 35 USC 154(b) by 974 days.

Delete the phrase "by 974 days" and insert -- by 1229 days --.

Signed and Sealed this

Tenth Day of August, 2010

David J. Kappos
*Director of the United States Patent and Trademark Office*